W. L. HENDRICKS.
POWER TRUCK FOR HARVESTERS AND THE LIKE.
APPLICATION FILED SEPT. 15, 1913.

1,239,484.

Patented Sept. 11, 1917.

Witnesses

Inventor
Walter L. Hendricks
by Gillson & Gillson
Attys.

UNITED STATES PATENT OFFICE.

WALTER L. HENDRICKS, OF AURORA, ILLINOIS.

POWER-TRUCK FOR HARVESTERS AND THE LIKE.

1,239,484.                Specification of Letters Patent.        Patented Sept. 11, 1917.

Application filed September 15, 1913. Serial No. 789,883.

*To all whom it may concern:*

Be it known that I, WALTER L. HENDRICKS, a citizen of the United States, and resident of Aurora, county of Kane, and State of Illinois, have invented certain new and useful Improvements in Power-Trucks for Harvesters and the like, of which the following is a specification, and which are illustrated in the accompanying drawings, forming a part thereof.

The invention relates to vehicle trucks and more particularly to a wheeled truck for tractors, harvesting machines and other agricultural implements. The object of the invention is to provide a truck of improved construction which shall be adapted to serve both for steering the vehicle with which it is to be associated, and for the transmission of power between the wheels of the truck and the operative or power generating parts of the vehicle.

Figure 1:
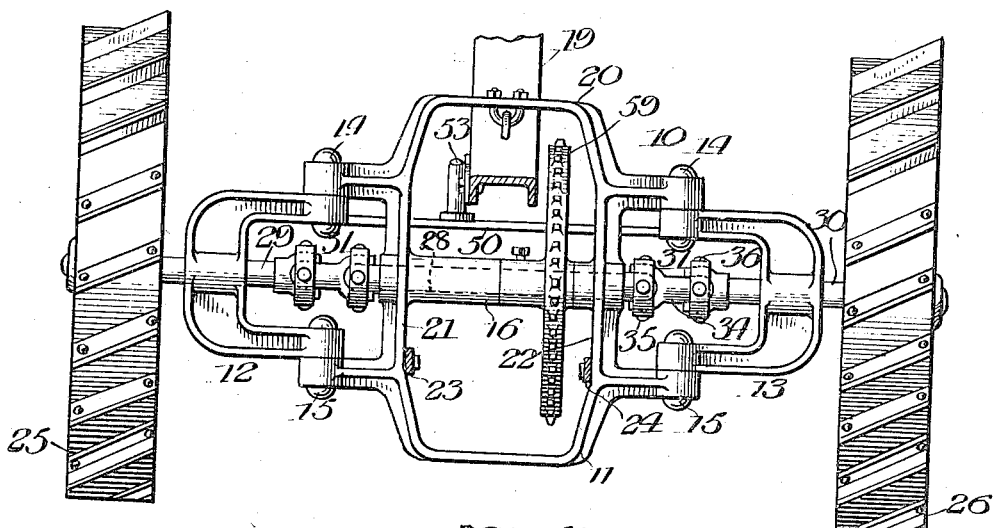
Figure 2:
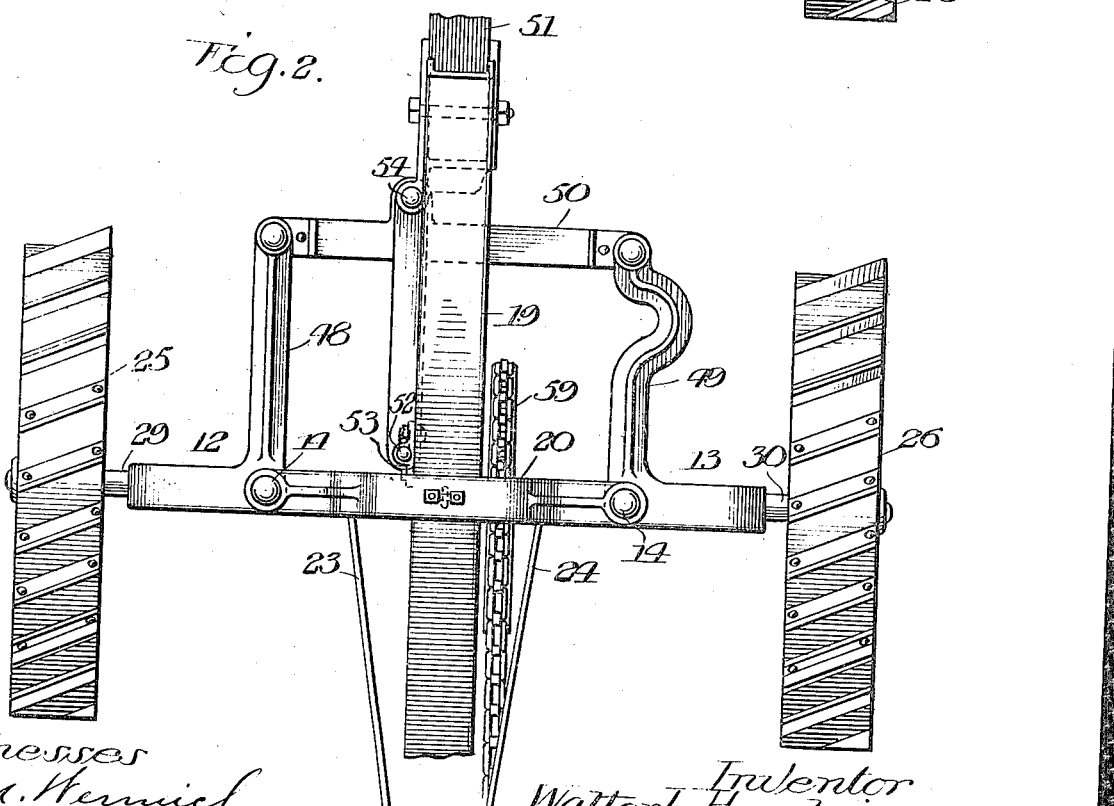

In the accompanying drawings,

Figure 1 is a rear elevation showing one form of truck embodying the features of improvement provided by the invention, the stub tongue of a harvesting machine to which the truck may be applied being shown partly in section, Fig. 2 is a plan view of the parts illustrated in Fig. 1.

In carrying out the invention a sectional bolster is preferably provided. Such a bolster is generally designated by the numeral 10 in each of the figures of the drawings.
As shown, the bolster 10 comprises an intermediate section 11 and outer sections 12 and 13, the latter being hingedly connected to the intermediate section 11, at its opposite ends. Each of the two outer sections 12 and 13 of the bolster are conveniently made of horizontal U-shape. When made in this form the hinged connection between each of the two outer sections and the intermediate section of the bolster will preferably be provided by the use of a pair of vertically alined pivot bolts 14, 15, each connecting one of the arms of the corresponding outer section with the intermediate section. The intermediate section of the bolster is shown as taking the form of an upright open frame having the axle, as 16, of the truck extending centrally therethrough.

In the form of construction illustrated the truck serves to support the stub tongue, as 19, of a harvesting machine. In this instance the truck takes the place of the so-called tongue truck of the harvesting machine, but in addition to performing the usual function of a tongue truck in an improved manner it supplies power for driving the operative parts of the machine. As shown, the stub tongue, 19, is suspended from the upper longitudinal member, as 20, of the open frame which constitutes the intermediate section 11, of the bolster 10.
The stub tongue is also connected to the uprights, as 21 and 22 of such frame, as by stays 23 and 24. These stays serve to maintain the bolster in upright position.

The wheels of the truck are indicated at 25 and 26. When power for driving the operative parts of the machine to which the truck is applied is to be derived from the movement of the wheels over the ground, the wheels are mounted upon the opposite ends of the axle, as 16, and are operatively connected thereto for driving the axle in at least one direction. When the wheels, 25, 26, are to be turned by power for moving the truck along the ground, they may be fixed upon the ends of the axle.

In this form of construction the axle 16 preferably comprises an intermediate section 28, and end sections 29 and 30. As shown, the intermediate section 28 of the axle is the part which extends through the intermediate section 11, of the bolster 10. This part is therefore desirably journaled in the members 21, 22. Each of the outer sections 29, 30 of the axle, as 16, extends through and is journaled in the corresponding outer sections 12, 13, of the bolster. The flexing of the hinges by which the outer sections 12 and 13, of the bolster, 10, are connected to the intermediate section 11, provides for the turning of the wheels 25, 26, for steering. This movement of the wheels is accommodated in the axle 16 by connecting each of the outer sections, 29, 30, of the axle to the intermediate section 28, by a universal joint. One form of such universal joint is generally designated by the numeral 31. Each universal joint 31 comprises a short section of shaft 34 having its opposite ends connected to the adjacent end of the intermediate section 28 of the axle 16 and to the inner end of the corresponding outer sections 29, 30, of the axle by knuckles 35 and 36. When universal joints of this form are employed, the outer sections 29 and 30 of the axle 16 are desirably slidingly journaled in the corresponding outer sections 12 and 13 of the bolster 10 to permit of a relative approach of the wheels, 25, 26, to the adjacent ends of the bolster during the flexing of the hinges by which the sections of the bolster are connected.

The two outer sections 12 and 13 of the bolster 10, are preferably connected for movement in unison about their respective pivots. As most clearly shown in Fig. 2, each of the outer sections 12 and 13 of the bolster is provided with a crank arm, as 48, 49, and these crank arms are connected by a link 50. Any convenient means may be employed for swinging the link 50 to steer the truck. When the truck is associated with a device adapted to be drawn by a team, a pole 51 is desirably employed. The inner end of the pole 51, is shown as being pivotally attached to the link 50 and the stub tongue 19 in rear of the link. To this end a bracket 52 is bolted to the stub tongue 19 adjacent the bolster 10 and a pivot bolt, 53, extends vertically through this bracket and through the pole 51. A bolt 54 serves for pivotally connecting the pole 51 and link 50. In the form of construction illustrated the hitch (not shown) will desirably be connected to the forward end of the stub tongue, 19.

In event the truck is to be associated with a machine having operative parts but not supplied with its own motive power, a sprocket wheel, 59, may be mounted upon the intermediate section 28 of the axle, 16, for transmitting power derived from the movement of the wheels 25, 26 over the ground to such operative parts (not shown). It will be understood that a truck embodying the features of improvement provided by the invention may be used either as the front or rear truck of a vehicle and that if desired two such trucks may be associated together and serve respectively as the front and rear trucks of a four wheeled vehicle.

I claim as my invention,

A flexible truck comprising, in combination, a three part bolster having its parts hinged together end for end for relative movement in a horizontal plane, a sectional shaft, one non extensible section of the shaft extending through and being journaled and fixed against longitudinal movement in the intermediate section of the bolster and each of the other sections of the shaft extending through and being slidingly journaled in one of the outer sections of the bolster, a pair of knuckle joints connecting the said section of the shaft which is journaled in the intermediate part of the bolster with each of the said sections of the shaft which are slidingly journaled in the two outer parts of the bolster, the two knuckle joints of each pair being located upon opposite sides of the line of the hinge joint between the adjacent parts of the bolster, a traction wheel mounted upon each section of the shaft which is journaled in one of the outer parts of the bolster and a power transmitting wheel mounted upon the section of the shaft which is journaled in the intermediate part of the bolster.

WALTER L. HENDRICKS.

Witnesses:
CHARLES B. GILLSON,
RUTH RINGLE.